United States Patent [19]
Barnebey

[11] 3,873,287
[45] Mar. 25, 1975

[54] MODULAR FLUID FILTER CONSTRUCTION
[75] Inventor: Herbert L. Barnebey, Columbus, Ohio
[73] Assignee: Barnebey-Cheney Co., Columbus, Ohio
[22] Filed: July 27, 1972
[21] Appl. No.: 275,564

[52] U.S. Cl.................. 55/479, 55/387, 55/484
[51] Int. Cl............................................ B01d 29/08
[58] Field of Search ............ 55/77, 79, 98, 99, 387,
 55/390, 474, 476, 479, 483, 484, 512, 517;
 23/288 R

[56] References Cited
UNITED STATES PATENTS

| | | | |
|---|---|---|---|
| 1,521,576 | 12/1924 | Wittemeier | 55/484 |
| 2,055,774 | 9/1936 | Ray | 55/484 |
| 3,319,401 | 5/1967 | Bogardus | 55/387 |
| 3,325,256 | 6/1967 | Calvert | 23/288 F |
| 3,350,860 | 11/1967 | Grassel et al. | 55/484 |

FOREIGN PATENTS OR APPLICATIONS

| | | | |
|---|---|---|---|
| 597,501 | 1/1948 | United Kingdom | 23/288 |

Primary Examiner—Bernard Nozick
Attorney, Agent, or Firm—Wm. Henry Venable

[57] ABSTRACT

This disclosure pertains to the construction of assemblies of granular material filled adsorbers or filters for fluids using modular components readily standardized to facilitate assembly of a variety of filter unit sizes and in diverse patterns from stock manufactured parts. The adsorber or filter panels may be of any desired shape and area. The modular components of this invention include housing sections, planar screens or perforate sheets separating adsorbent-filled panels from adjacent fluid inlet and outlet, and panel edge strips connecting and spacing the planar screens or perforate sheets.

5 Claims, 15 Drawing Figures

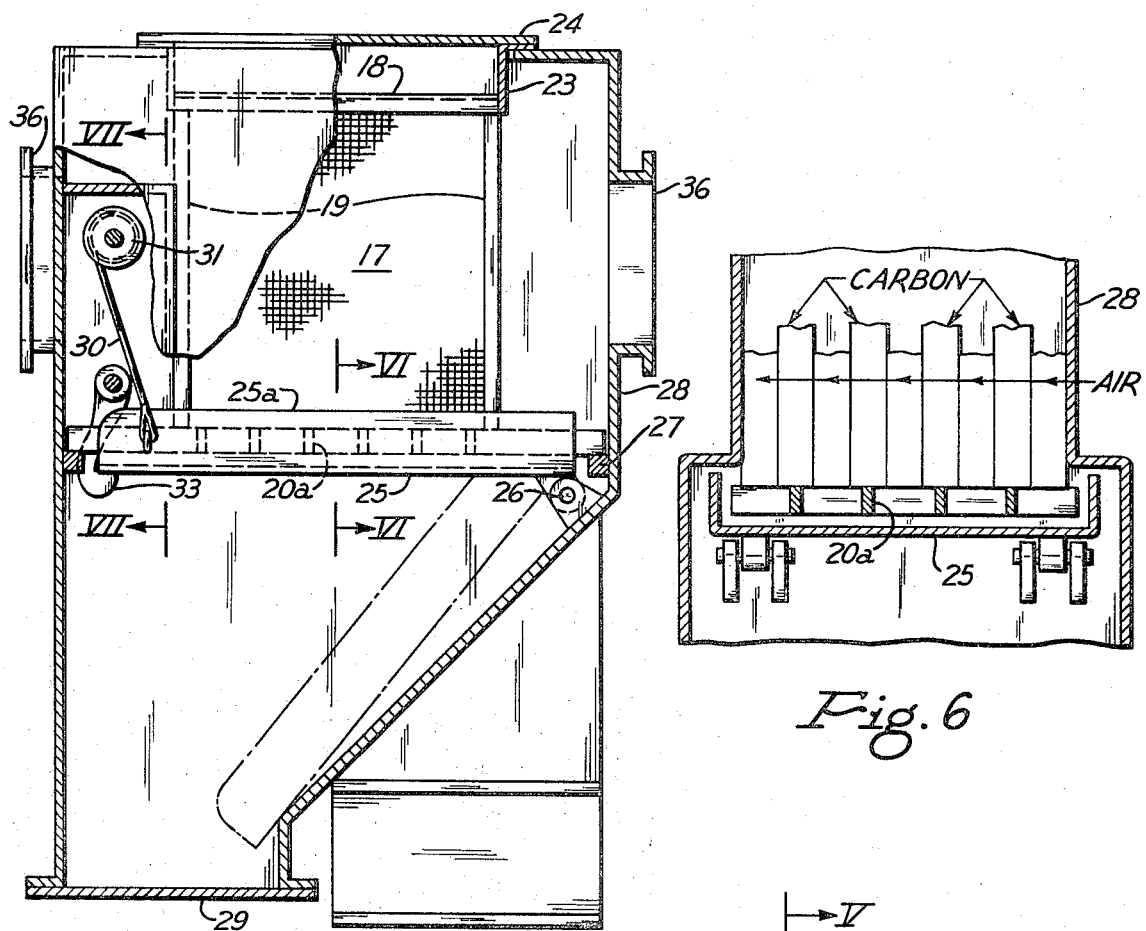
Fig.5
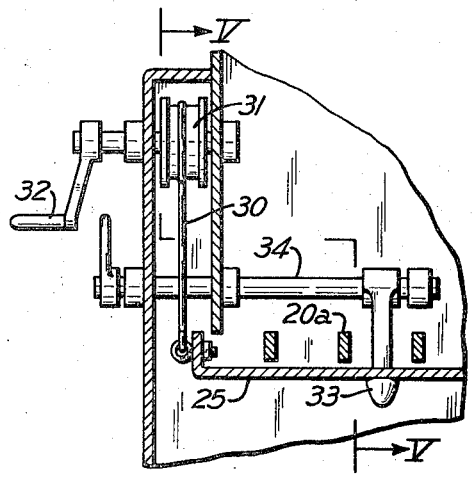
Fig.6
Fig.7
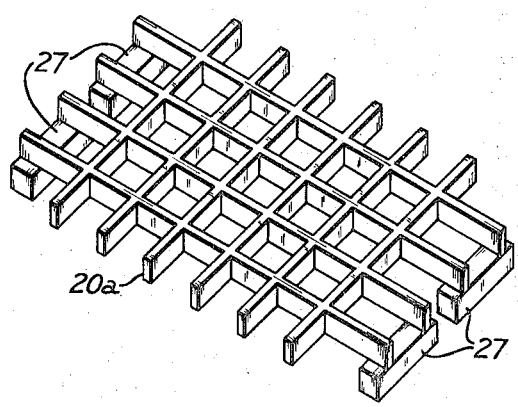
Fig.8

MODULAR FLUID FILTER CONSTRUCTION

CROSS-REFERENCE TO A RELATED APPLICATION

The modular components disclosed herein are particularly adapted to be assembled in the form of a Fluid Filter with Submerged Passages as broadly disclosed and claimed in co-pending Barnebey et al Pat. application Ser. No. 122,970 file on Mar. 10, 1971 now abandoned.

BRIEF SUMMARY OF THE INVENTION

This invention relates to granular-filled filters or adsorbers in the form of a series of generally vertical-plane surfaced layers of granular adsorbent with fluid inlet and air outlet spaces between alternate layers, assembled in a housing such that the granular material may be poured into the layers to fill them and drained therefrom for renewal from time to time with fresh material. The construction comprises modular sizes of housing components providing a fluid inlet manifold on one side and fluid outlet manifold on the opposite side, modular sizes of planar perforate walls for confining the granular filter in layers, modular sizes of formed strips fitting the edges of a pair of the planar walls adjacent both the inlet and the outlet side of the housing, and a barrier contiguous with one edge of each such formed strip extending across the fluid space between adjacent layers of granular material to an edge of one of the formed strips for the next adjacent layer of granular material.

BRIEF DESCRIPTION OF THE DRAWINGS

The drawings illustrate filter or adsorber assemblies constructed with a variety of embodiments of my invention.

FIGS. 5, 6 and 7 illustrate another housing and filter assembly embodying my invention. FIG. 5 is a side view of this assembly from which the greater part of the side of the housing on the viewer's side has been removed, thus to shown the internal construction. FIG. 6 is a partial section at the vertical plane VI—VI in FIG. 5, and FIG. 7 is a partial vertical section at the plane VII—VII in FIG. 5.

FIG. 8 is an isometric view of the grating component which appears in assembled position in FIGS. 5, 6 and 7.

DETAILED DESCRIPTION

My invention relates to the construction of filters and adsorbers for treating fluids, particularly air or other gases or vapors, with a particular adsorbent or filter material such as granular activated carbon. The containing structure for the granular material is first assembled of its component parts, and the spaces or zones therein provided to contain the adsorbent or filter material are filled after such assembly. These spaces for containing adsorbent include sealing layers as more fully disclosed in Barnebey et al, application Ser. No. 122,970 filed on Mar. 10, 1971, entitled "Fluid Filter with Submerged Passages." The present invention more particularly relates to such a filter construction assembled from sets of simple shop manufactured components in modular dimensions, such that any of a diverse number of sizes and styles of adsorbers of filters can be assembled therefrom.

Figure 1:
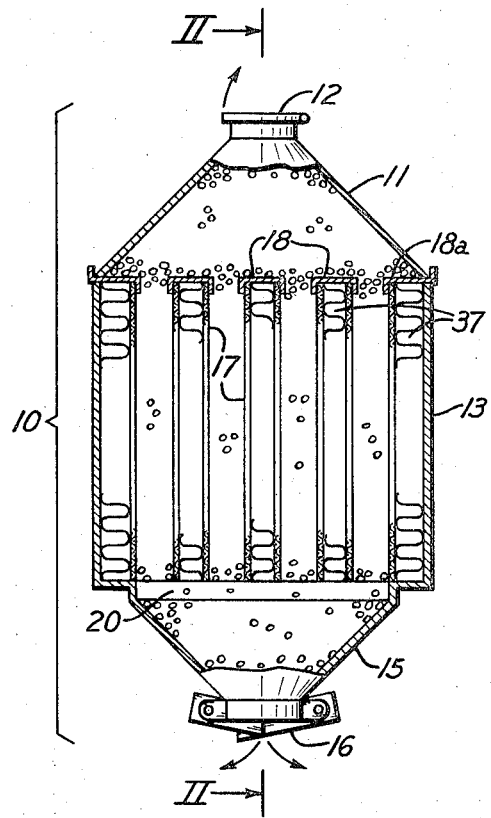
FIG. 1 is a vertical cross section through assemblies provided with a filling hood at the top and discharge funnel at the bottom.
Figure 2:
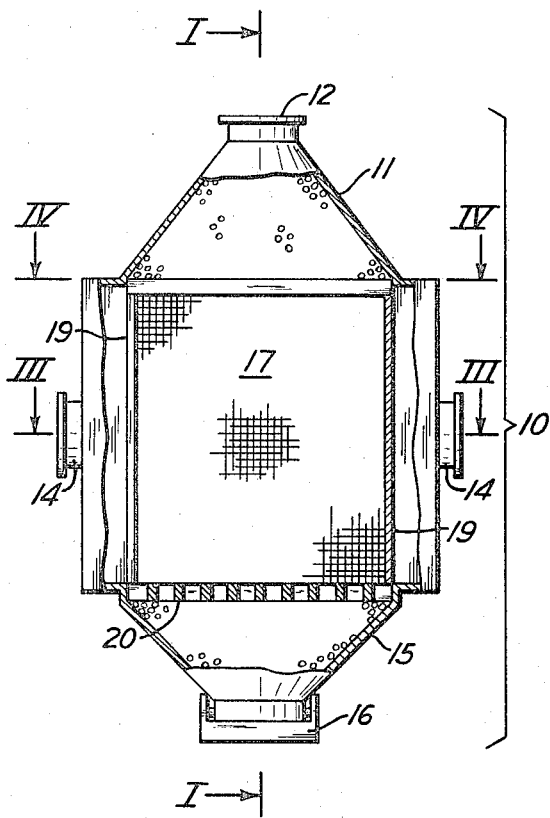
FIG. 2 is a vertical cross section transverse to that shown in FIG. 1, at the plane II—II in FIG. 1.

Referring to the drawings, FIGS. 1 and 2 are vertical cross sections through the central axis of an embodiment of this invention in which the containing housing 10 is comprised of three major components. These are a downwardly flared hood 11 having a hinged or removable filling cover 12 at the top, a generally rectangular central box section 13 provided on two opposite sides with fluid inlet (or outlet) connections 14, and a bottom funnel portion 15 provided with granular material discharge means, bottom dump gates 16 being illustrated in this particular example.

Within the central box section 13, the components defining the zones or spaces which will be filled with granular material supplied through the hood 11 are assembled. These components consist of four essential modular parts: (1) a set of vertically extending plane screens or perforated sheets 17 between alternate pairs of which the granular material is to be contained and open spaces for fluid flow are provided, (2) a set of caps 18 and 18a placed over pairs of the screens 17 above the open spaces to cover these spaces so that they will not be filled with granular material introduced through the hood 11, (3) two sets of preformed end strips generally indicated by the reference numeral 19 in FIG. 2 which extend along the vertical edges of pairs of screens on the inlet and outlet sides of the rectangular box 13, and (4) a set of barriers, thereafter more particularly described, between vertical edges of pairs of screens providing the open spaces. As illustrated in FIGS. 2, 3A, 3B, 3C, and 4A, 4B, 4C, the lsteral walls of box section 13 on two opposite sides, are spaced beyond the end strips 19 on opposite sides of the assembly. This spacing thus forms a fluid inlet manifold communicating with the fluid inlet spaces between the strips 19 on one side of the assembly, and similarly forms a fluid outlet manifold communicating with the outlet spaces between the strips 19 on the opposite side of the assembly.

Figure 3A:
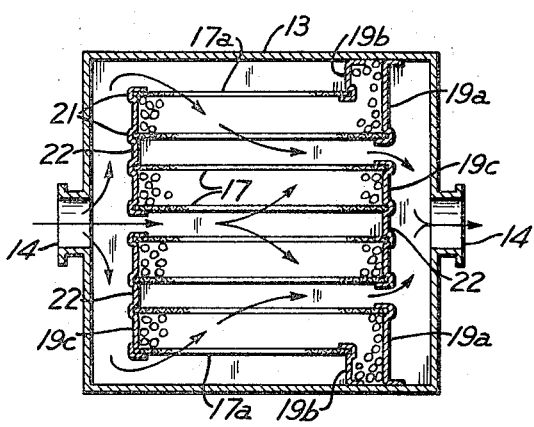
FIGS. 3A, 3B, and 3C are horizontal cross sections of three alternate embodiments of this invention, at the plane III—III in FIG. 2.
Figure 3B:
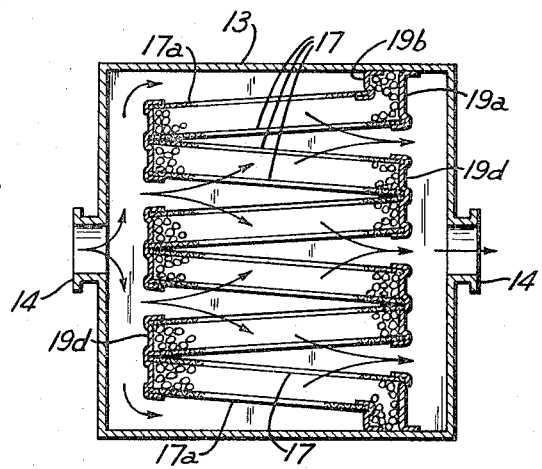
Figure 3C:
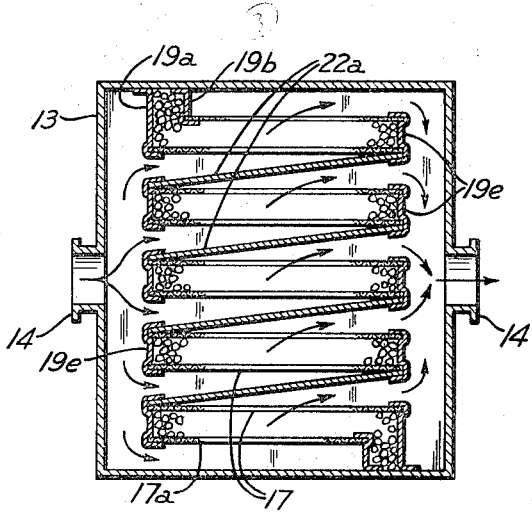

In the embodiments for which the axial vertical sections are as shown in FIGS. 1 and 2, the screen modules 17 are square or rectangular (square modules being illustrated) assembled in vertical planes which may be parallel as shown in FIGS. 3A and 3C, or in pairs horizontally inclined as shown in FIG. 3B. The cap modules 18 and 18a and the end strip modules 19 are made and stocked in a variety of shapes and sizes to permit selection of any desired configuration of screen and barrier arrangement within a housing box 13.

The assembly of the internal modules defining the areas of granulated material zones or spaces rests upon a grating platform 20 at the junction of the bottom of the rectangular box 13 with the top of the funnel 15. As the filtering zones are filled from above with granulated materials, this material first flows through the grating to fill the funnel and provide a granulated carbon seal across the bottom of those pairs of screens 17 which define the empty or fluid flow zones between such pairs of screens.

The different screen arrangements shown in FIGS. 3A, 3B, 3C and 4A, 4B and 4C, at their vertical midsections, all would appear as shown in FIGS. 1 and 2, FIGS. 3A, 3B and 3C being three different horizontal cross sections at the plane III—III in FIG. 2 and FIGS. 4A, 4B and 4C being the corresponding plan view at the top of the screens showing the various caps.

Figure 4A:
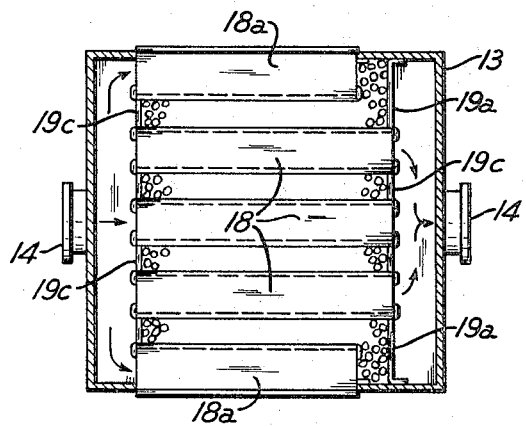
FIGS. 4A, 4B and 4C are plan views looking down on the housing and filter assembly with the hood removed, for the same three embodiments shown in section in FIGS. 3A, 3B and 3C.

In the arrangement illustrated by FIGS. 3A and 4A, the screens 17 are all parallel, and all except the extreme end screens 17a are of the same modular dimensions. The two end screens 17a are preferably somewhat shorter in width than the next screen 17 of the end pairs confining granulated adsorbent. On the fluid outlet side of the box, these end pairs of screens 17 and 17a are held in, and spaced from the box walls by, separate preformed end strip modules 19a and 19b respectively, the strip 19b being spaced from the strip 19a at the distance equal to the difference in width of screens 17a and 17b. The space between these strips 19a and 19b is filled with granulated carbon. The two cap modules 18a at the sides of the box 13 match in length the width of the screen modules 17a, thus covering only the air space between the end screens and the box wall but leaving uncovered the top area between end strip modules 19a and 19b for flow of granular material therein from the hood 11 above.

The other end strip modules 19c in FIG. 3A are all alike and include, as an integral portion thereof, the barriers previously mentioned. These modules are in the form of flat sheets into which four parallel transverse folds 21 have been formed, two being along the edges of the modules 19c. These modules match in length the vertical height of the screen panels and the folds 20 embrace the vertical edges of the screens. The midportion 22 of these modules, between the two interior folds 21, forms the barrier closing the empty space (i.e., the inlet or outlet manifold) from the box interior on the side on which the end strip 19c is installed.

The caps 18 match in length the full width of the screens 17 and are placed across pairs thereof to cover the open spaces below and prevent flow of granular material from hood 11 therein. These caps 18 and 18a correspond in function to the closure members 59 seen in FIG. 3 of Barnebey et al, Ser. No. 122,970 previously referred to, but are simpler modular design and form. The caps 18 are inverted channel shape in cross section, and simply rest on the upper edges of the screens 17, the downturned edges overlapping the screens on granular-material filled sides so as to embrace a pair of screens across the empty air spaces, as shown in FIG. 1. Caps 18a are generally Z-shaped with rightangle bended flanges on each side, assembled in the filter with one flange extending downwardly adjacent the screens 18a, on which that side of the caps 18a rest. The opposite side of the caps rest on a top edge of the rectangular box 13 and the upturned flange forms a corner on which the bottom edge of the hood 11 is supported on each side of the assembly. These caps need not be fastened or tightly secured to the screens as the granular material surrounds the joints and provides all the seal necessary.

Figure 4B:
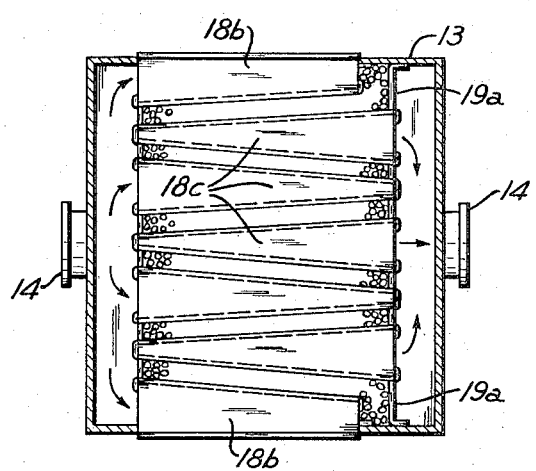

FIGS. 3B and 4B illustrate an assembly of modules in which pairs of screens containing granular material are inclined to one another horizontally, the two screens during the empty space being spaced apart on one side but not on the opposite side, thus forming V-section air spaces between rectangular section, granular material filled filter or adsorbing panels. The two end screens 17a are of less width than the interior screens 17, as in the FIG. 3A embodiment, and the end strips 19a and 19b are also the same modules. The remaining end strips modules 19d are formed with three folds 21 only, the two screens which meet being both contained in the middle fold which thus constitutes the barrier, integral with the end strip, preventing fluid flow directly from the air space between screens into, or from, the adjacent side of the box 13. The caps in this embodiment are also modules similar to those described in connection with FIG. 4A except that the end caps 18b in FIG. 4B are truncated pyramids in plan view and the remaining caps 18c are acute angle shaped in plan, covering air spaces of corresponding horizontal cross section, as shown in FIG. 4B.

Figure 4C:
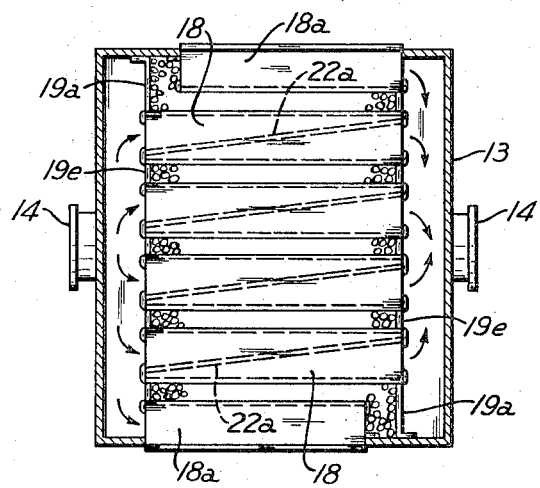

The arrangement of modular components illustrated in FIGS. 3C and 4C is constructed of screen modules 17 and 17a all parallel to one another, caps 18 and 18a and corner forming edge strip modules 19a and 19b, differing from the FIG. 3A arrangement as to these components only in that the corners formed by the edge strips 19a and 19b are diagonally opposite one another in FIG. 3C whereas they are on the same side (either inlet or outlet side) of the assembly in FIG. 3A. The other edge strips 19e in this embodiment, however, have a width extending across one pair of screens only, and the barrier modules are imperforate sheets 22a of the same height as the screen modules 17, extending diagonally between opposite edges of screen modules 17 under the caps 18. The adjoining edges of the barrier modules 22a and the screen modules 17 are inserted in the same fold 21 at one side of a strip 19e.

Figure 10A:
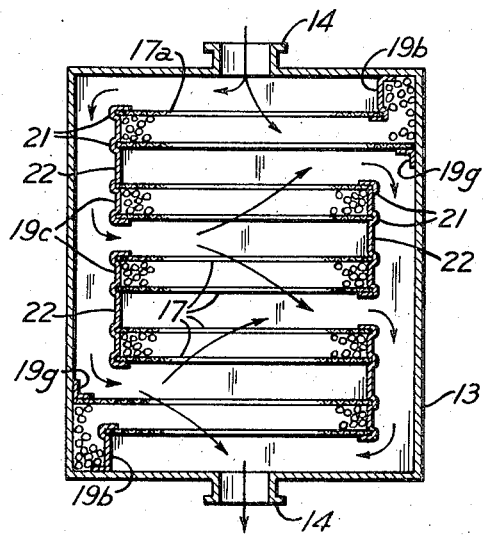
FIGS. 10A and 10B are sectional views similar to FIGS. 3A and 3B, but illustrating the inlet and outlet nozzles on an axis of right angles to the axis on which they appear in FIGS. 3A and 3B.
Figure 10B:
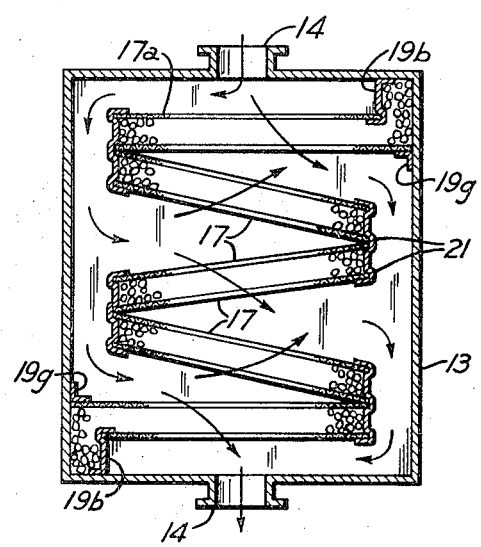

The inlet and outlet nozzles 14 may be on any two opposite sides of the box 13. In FIGS. 2 and 3A, 3B, 3C, the nozzles are shown on the sides parallel to the edge strips 19, that is, on the housing walls forming the outside of the inlet and outlet manifolds. FIGS. 10A and 10B illustrate assembly of the modules in a box with the nozzles 14 on opposite sides generally parallel to the screens 17a. With this arrangement, edge strips 19b are located close to the side wall and edge strip 19a is replaced by an angle shaped strip 19g placed against the wall, the first adsorbent filled panel extending to the wall on one side. Thus the air spaces between the screens 17a and the walls of housing 13, to which the nozzles 14 connect, form ducts communicating with the inlet and outlet manifolds on the other two sides of the assembly.

Comparing the flow of fluid through the adsorber or filter assembly provided by these three different assemblies of the modules, in the FIG. 3A and FIG. 4A arrangement there are shown five open spaces under the caps 18a and 18 and four granular adsorbent filled panels between pairs of screens 17a and 17. Assuming the fluid flow to be from left to right, fluid to be treated enters the two open spaces under caps 18a at opposite sides of the box 13 and the central open space under the cap 18 at the middle, being blocked from entering the other two spaces by the barriers 21. The fluid then flows transversely through the adsorbent filled panels into the remaining two passages, opening at the right hand side between the ends of strip modules 19a and 19b.

The FIG. 3B and FIG. 4B arrangement provides substantially the same flow pattern, but the horizontal V-pattern is somewhat more compact, enabling six adsorbent filled panels to be assembled in the same housing which accommodates only four panels with the FIG. 3A and FIG. 3B assembly.

The flow using the module assembly arrangement of FIG. 3C contrasts with that of FIGS. 3A and 3B in that, with the diagonal barrier sheets 22, there are as many inlet and outlet openings between the edge strips as there are panels between screens 17 and 17a filled with adsorbent, and the out-flowing filtered fluid from each panel is not commingled with such fluid through the adjacent panel until it enters the outlet manifold side of the rectangular box 13.

The foregoing comparison of these three optional assemblies, which do not exhaust the variety of arrangements that are possible using this modular construction, is given to provide a clear understanding of their operation. They all provide parallel flow transversely through each of a series of a plurality of panels of granular adsorbent or filter material. Such flow pattern is not per se new; it was known at least since 1884 when Kutsche's U.S. Pat. No. 296,758 for Dust Arrester issued. Kutsche's construction was, however, merely an assembly of framed filtering screens and is not adaptable to granulated solids The filter assembly illustrated by FIGS. 5, 6, 7 and 8 differs from the foregoing essentially in the housing arrangement. The screens 17 and caps 18 may be the same modular parts as previously described and assembled in the same manner. The grating floor 20a corresponds to the grating 20 in FIGS. 1 and 2. However in this embodiment the hood 11 is replaced by a shallow rectangular frame 23 having removable cover plate 24, coextensive in area with the area of the top of the series of adsorbent panels and fluid flow passages formed by the screen, edge strip and cap assembly. Instead of a funnel 15 which would be filled with granular adsorbent, in this embodiment a hinged dump door 25 is provided just below the grating floor 20a. This door is hinged at one side of the housing by hinge 26 and has a length sufficiently greater than the width of the rectangular screens that the granular material flowing through the grating laterally at its angle of repose beyond the bases of the edge strips 19, will not flow over the ends of the door but be entirely retained thereon. The sides of the door 25 are provided with upturned flanges 25a extending at least to the level of the top of the grating panel 20a, and preferably slightly higher, as illustrated in the drawing figures, thus retaining the material laterally such that the gate need not be substantially wider than the panel assembly. Such doors may be constructed in modular sizes to provide stock sets from which can be selected any size fitting any screen width and number of panels. In FIGS. 5, 6 and 7 this door is shown extending, from hinge 26 to tip, parallel to the bottom edges of the screens 17 and just below the grating bar extensions which rest on ledges 27 fastened to the side wall of the housing 28.

The housing 28 widened from the level of the door to its bottom opening which is covered by the removable cover plate 29. This section of the housing has vertical walls on three sides and a sloping wall on the side to which the door 25 is hinged, and extends downwardly far enough to permit the door to drop to a steep enough slope to act as self-cleaning chute for all the granular solids when the door is open. At that time, of course, the cover plate 29 would also be removed and a drum or sack would be placed under the opening to receive discharged material. The door may conveniently be closed by a cable 30 and winch 31, enclosed in a box-like extension of the housing 28 on one side through which extends the winch shaft operated by handle 32. The door is held closed by a latch 33 on a shaft 34 which extends through the housing wall where it is provided with a handle 35 by which the latch may be released when it is desired to empty the adsorber unit of granular adsorbent material.

When the modular components have been assembled to provide a filter having the desired predetermined number and thickness of adsorbing or filtering zones each of a predetermined area, in accordance with the filtering or adsorbing treatment for the gas to be treated at the rate of flow required, the cover plate 24 is removed and the assembly is filled with granulated carbon or whatever other filtering or adsorbing material is to be used. The operator makes certain that the door 25 is latched closed before filling the assembly. The filling continues until the panel caps 18 have been covered with a sufficiently thick layer of adsorbent for sealing, the top layer being leveled off by a strike-off operation, and then the cover plate 24 is replaced. Meanwhile fluid inlet and outlet conduits are connected to the nozzles 36 on opposite sides of the housing, and the filter is ready for operation.

Figure 9:
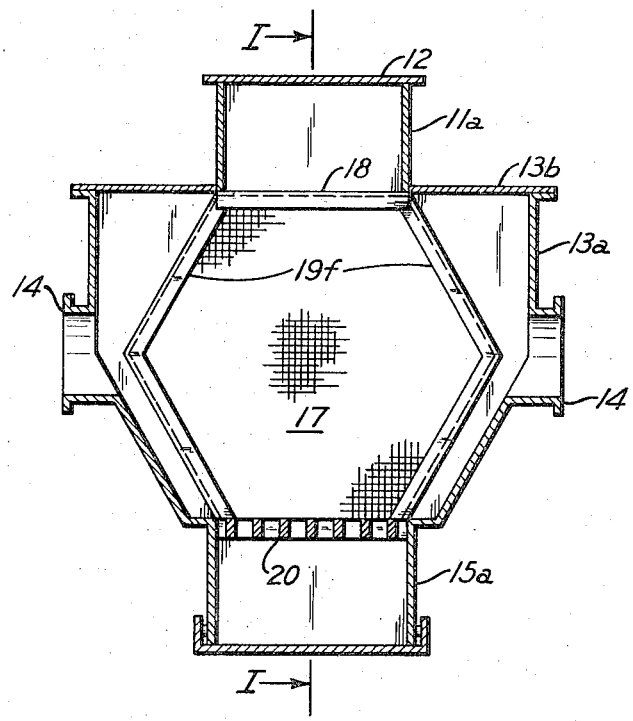
FIG. 9 is a section comparable to FIG. 2, illustrating hexagonal instead of square filter areas.

In the foregoing examples, the screen modules 17 illustrated are rectangular, but other shapes may be used as well. FIG. 9 is a sectional view similar to FIG. 2, but having hexagonal screens 17b. A transverse section through the center of this embodiment, at the plane I—I in FIG. 9, is the same as in FIG. 1. In this embodiment, the hood 11a and funnel 15a are shown with inclined walls from the doors to opposite ends of the series of panels (FIG. 1), the other two walls being vertical (FIG. 9), the door 12 and gates 16 being as wide as one side of the hexagonal screens. The central box section 13a is constructed with a width somewhat greater than the diagonal of the hexagonal screen assembly, and provided with removable cover plates 13b on each side for the placement of this assembly into the box. The edge strips 19f in FIG. 2 are shown bent to an 120° obtuse angle at their centers to fit two sides of the hexagonal screens but they may be made of two separate straight strip modules each of the same length as a side of the hexagonal screens 17b.

In all the embodiments described above, there may be included screen interior supporting and spacing modules in the form of woven wire panels 37 shown in FIG. 1, in which the woven helical wire loops of which the panel is woven have the width desired between pairs of adjacent screens 17. Such woven wire supports are shown in the open passages for inlet or outlet of air or other fluid, in FIG. 1, but they may be alternatively, or additionally, provided between pairs of screens containing granulated solids. These screen spacing and supporting modules may, if desired, be wired or otherwise attached to the screens at one or more points, which may be preferred if installed only between alternate pairs of screens. Such would be the case in the embodiments of FIGS. 3B and 3C; in the former, the spacing modules 37 would be between parallel screens 17 only, while in the latter, they would not be placed between screens where the diagonal barriers 22a cross the passages diagonally.

I claim:

1. In a fluid-solids contacting assembly of the class of filters and adsorbers in the form of a series of generally vertical plane-surfaced layers of granular fluid-treating material alternately arranged between fluid inlet and fluid outlet spaces, the improvement comprising a combination of modular apparatus components adapted for factory or field assembly into adsorbers of selectable sizes and capacities, said combination being comprised of:
   a. a housing enclosure for said adsorber in laterally spaced relation to said layers of granular fluid-treating material providing a fluid inlet manifold on one side and a fluid outlet manifold on the opposite side thereof,
   b. a series of pairs of vertically extending perforate planar wall components assembled between said fluid inlet and fluid outlet manifolds within said housing, the two wall components of each pair being in spaced-apart, parallel planes and constituting means for confining a layer of granular fluid-treating material within each of said pairs, said pairs of perforate wall components being open within said housing along the top and bottom edges of said perforate wall components,
   c. caps spacing apart adjacent pairs of perforate wall components between the top edges thereof from fluid inlet to fluid outlet manifold within said housing, said caps covering the spaces between said pairs whereby said spaces remain open fluid inlet and fluid outlet spaces alternating between said pairs;
   d. edge strips extending between and fitting the side edges of said pairs of perforate wall components adjacent said fluid inlet and fluid outlet manifolds, said edge strips thus bounding the lateral edges of the layers of granular fluid-treating material contained within said pairs of wall components;
   e. means contiguous with the edges of said edge strips fitting the side edges of said pairs of perforate wall components, said means forming barriers preventing direct fluid flow from said fluid inlet manifold to said fluid outlet manifold through the open spaces between said pairs of perforate wall components
   f. said housing including granular material enclosure components above and below the assembled pairs of perforate wall components, namely
      i. means for retaining a top layer of granular material covering said caps and the layers of granular material confined within said pairs of perforate wall components, and
      ii means for retaining a bottom layer of granular material at the base of said perforate wall components, said bottom layer forming the bottom boundary of said fluid inlet and fluid outlet spaces covered by said caps and also supporting the granular material layers confined within said pairs of perforate wall components.

2. A fluid-solids contact assembly as set forth in claim 1, further characterized in that said edge strips are provided with pleats extending along their edges forming channels to receive the lateral edges of at least one pair of said planar walls.

3. An assembly as set forth in claim 1 further characterized in that said edge strips are provided with additional pleats intermediate their edges to receive the lateral edges of two pairs of said planar walls.

4. A fluid-solids contact assembly as set forth in claim 1 in which said means for retaining a layer of granular material covering said caps is a downwardly flared hood at the top of said housing and said means for retaining a layer of granular material resting against the bottom edges of said perforate planar wall components is a funnel at the bottom of said housing having a normally closed opening at the outlet thereof.

5. A fluid-solids contactor as set forth in claim 1 in which said means for retaining a layer of granular material resting against the bottom edges of said perforate planar wall components is a hinged dump door mounted below said bottom edges.

* * * * *